March 10, 1964     W. M. THOMPSON     3,124,062

SCRAP METAL SHEAR AND CHARGING BOX THEREFOR

Filed June 15, 1960     7 Sheets-Sheet 1

INVENTOR
WALLACE M. THOMPSON

BY Cushman, Darby & Cushman

ATTORNEYS

Fig. 3.

INVENTOR
WALLACE M. THOMPSON

BY Cushman, Darby & Cushman
ATTORNEYS

March 10, 1964 W. M. THOMPSON 3,124,062
SCRAP METAL SHEAR AND CHARGING BOX THEREFOR
Filed June 15, 1960 7 Sheets-Sheet 3

Fig. 4

INVENTOR
WALLACE M. THOMPSON

BY Cushman, Darby & Cushman
ATTORNEYS

March 10, 1964 W. M. THOMPSON 3,124,062
SCRAP METAL SHEAR AND CHARGING BOX THEREFOR
Filed June 15, 1960 7 Sheets—Sheet 5

INVENTOR
WALLACE M. THOMPSON
BY Cushman, Darby & Cushman
ATTORNEYS

March 10, 1964 W. M. THOMPSON 3,124,062
SCRAP METAL SHEAR AND CHARGING BOX THEREFOR
Filed June 15, 1960 7 Sheets-Sheet 7

INVENTOR
WALLACE M. THOMPSON

BY Cushman, Darby & Cushman

ATTORNEYS

United States Patent Office 3,124,062
Patented Mar. 10, 1964

3,124,062
SCRAP METAL SHEAR AND CHARGING BOX THEREFOR
Wallace M. Thompson, Cordele, Ga., assignor to Harris Foundry & Machine Co., Cordele, Ga., a corporation of Georgia
Filed June 15, 1960, Ser. No. 36,367
24 Claims. (Cl. 100—215)

This invention relates to an improved charging box for a machine for operating on metal scrap, such as a shear or a baling press. In particular, the invention relates to improvements in a charging box of the type shown in Patent No. 2,932,247. Although a charging box embodying this invention has particular utility for use with a scrap metal shear, and will be described with reference thereto, it will be understood that the invention is applicable to charging boxes for other types of machines for operating on metal scrap, such as a baling press. The invention also relates to improvements in scrap metal shears, as will appear more fully hereinafter.

Metal scrap frequently is passed through a shear, usually of the hydraulic type, in order to cut or chop the scrap into smaller pieces for convenience of handling in further processing. Scrap shears of this nature usually are provided with an elongated charging box into which metal scrap is placed and advanced into the shear by a charging ram, the head of which forms an end wall of the box. Conventional charging boxes of the aforedescribed type, however, have various limitations. For example, the cross-sectional size of the box usually must correspond to the size of the opening between the cutting blades of the shear. Consequently, a conventional box cannot receive scrap of a size much larger than that which will pass through the shear, i.e., which will fit within the box, and larger pieces of scrap must preliminarily be reduced in size, usually by cutting with an acetylene torch, before they can be placed in the charging box.

Scrap metal shears presently in use have a flat work-feeding bed or table terminating at one edge in a fixed lower blade provided with a straight horizontal cutting edge. Charging boxes for such shears correspondingly have a flat bottom essentially constituting an extension of the bed, so that material can be pushed without obstruction from the box across the fixed cutting blade. The upper and movable cutting blade of a shear, however, has an inclined cutting edge in order to obtain an appropriate shearing action in cooperation with the lower fixed blade. In some instances, the upper movable blade has the configuration of an inverted V, again to achieve proper shearing action. When plate-type metal scrap is cut up by a shear of this nature, the resulting cut pieces are not flat, but either curled, curved, or in the case of an inverted V-shaped movable shearing blade, are, in turn, substantially V-shaped. Such result is undesirable because curled or bent cut-up plate scrap has what is known as less density, when packed for transport, such as in an open-topped hopper-type railroad car.

Scrap to be cut up in a shear frequently is in the form of pipe or elongated structural members, such as angle bars or the like. It obviously is desirable for such scrap to be passed in a lengthwise direction between the shearing blades. Conventional charging boxes, however, are devoid of any mechanical means for properly orienting such elongated scrap for lengthwise passage through a shear. Consequently, any such orientation must be accomplished by hand, if at all.

Conventional charging boxes of the type under consideration, and which are provided with a lid, usually are charged or loaded by a crane, or sometimes even by means of a pushing device, such as a bulldozer. When the lid is closed, however, and the ram is moving the scrap material from the box into a baling press or through a shear, the loading operations must be substantially suspended.

The charging box disclosed in the above-mentioned Patent 2,932,247, is provided with a divided lid, i.e., a lid formed in two separately movable parts arranged so that a dividing line or gap runs longitudinally along the box between the two lid parts when the latter are closed. In operation of a box of this type, it will be seen that when the lid is closed dirt and small pieces of metal scrap may sift through the gap between the two lid parts. Of course, such sifting of dirt and other debris into the charging box in front of the ram therein causes no difficulty whatever. On the other hand, it will be seen that if any dirt or other debris sifts into the charging box behind the ram, i.e., when the latter is advanced, such dirt and debris not only may tend to hinder or actually prevent retracting movement of the ram, but also may possibly tend to scratch and score or otherwise damage the piston rod of the ram.

Accordingly, it is an object of this invention to provide an improved metal scrap charging box which will take scrap pieces larger than those receivable in a conventional charging box for a shear or other machine of comparable size.

It is another object of this invention to provide an improved metal scrap charging box which will receive and compress oversize bulky scrap into a bundle having smaller cross-sectional dimensions suitable for feeding directly into a shear or other machine for operating on scrap metal.

It is another object of this invention to provide an improved metal scrap charging box that is equipped with means for facilitating the loading of scrap thereinto in such a manner that the loading operations of separate apparatus, such as a crane or the like, need not be suspended while the box is closed and while the material therein is being pushed into a baling press or through a shear.

It is another object of this invention to provide an improved metal scrap charging box which inherently tends to align elongated scrap metal, such as pipes and elongated structural members, lengthwise of the box.

It is another object of this invention to provide an improved shear, and a charging box therefor, which will maintain flat scrap metal such as scrap plate and the like, in a substantially flat condition when cut up by the shear.

It is a further object of this invention to provide an improved metal scrap charging box, which will confine and compress bulky scrap and which has a longitudinally divided lid, with means for preventing dirt and debris sifting through the lid, i.e., through the gap between the lid parts, and into the box behind the charging ram.

Other objects and advantages of the invention will be apparent from the following description and accompanying drawings, in which.

Figure 1:
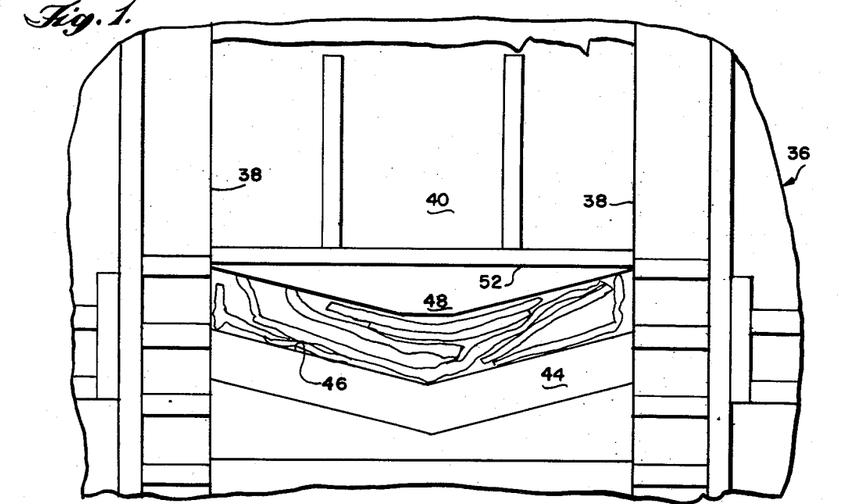
FIGURE 1 is a fragmentary front elevational view of a shear embodying this invention. Scrap metal is shown in operative position to be cut by the shear.
Figure 2:
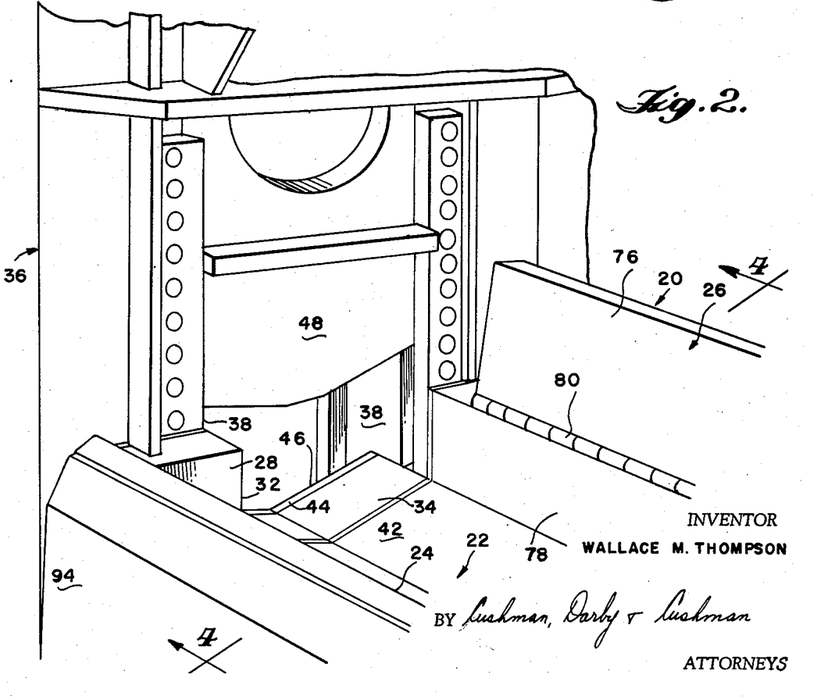
FIGURE 2 is a fragmentary perspective view of the rear of the shear shown in FIGURE 1 and of a charging box therefor embodying this invention. The box is shown in its fully open condition with the metal scrap omitted in order to better illustrate details.
Figure 4:
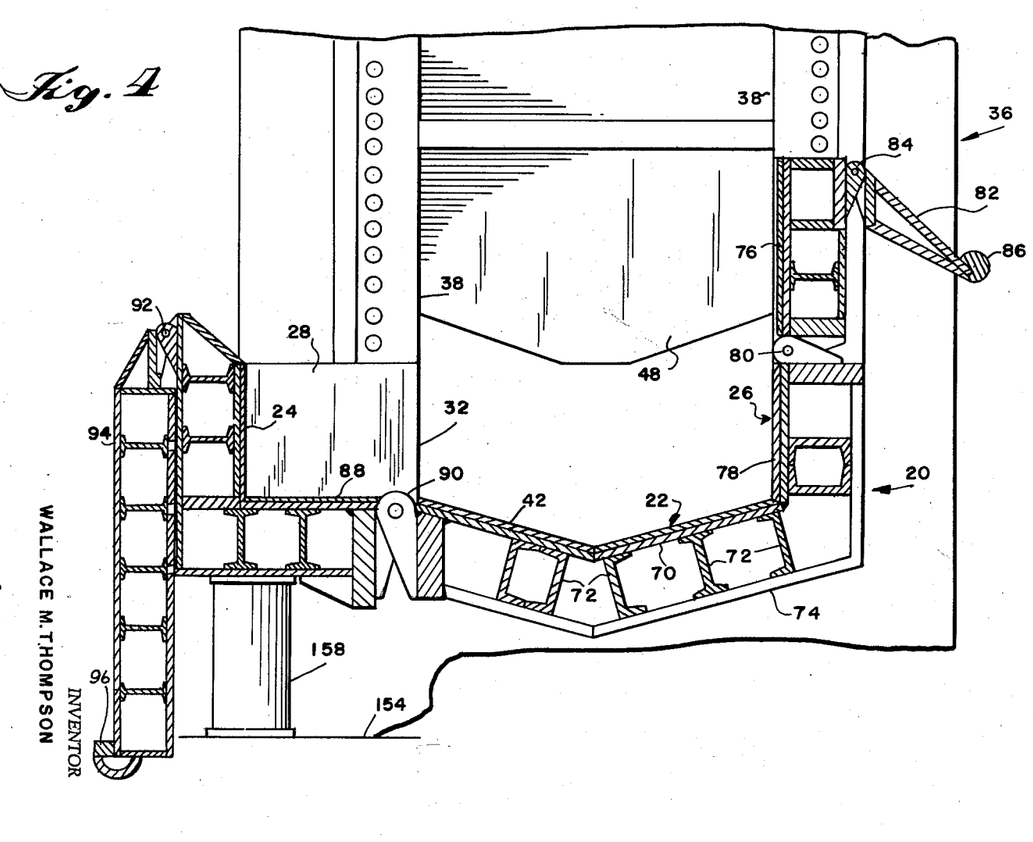
FIGURE 4 is a sectional view taken substantially on line 4—4 of FIGURE 2.

Referring now to the drawings there is shown an expansible and contractible metal scrap charging box 20, generally of welded construction. The box 20 has an elongated bottom wall 22 generally rectangular in plan form, opposed and substantially parallel side walls 24 and 26 which are upright when the box is open and fully expanded, and upright end walls 28 and 30 which overlap the ends of the side wall 24. The end wall 28 is notched or cut away at one side flush with the side wall 26 to provide a generally rectangular open-topped discharge opening 32 (FIGURES 2, 4 and 5) of less width than the box 20 when the latter is fully expanded, as shown in FIGURES 2 and 4. The bottom edge of the opening 32 is flush with the bottom wall 22 of the box 20 and also with the bed or feed table 34 of a hydraulic shear 36 positioned to be charged with scrap from and by the box, as shown in FIGURE 2. The side edges of the opening 32 may be substantially flush with the inner edges of the uprights 38 which guide the upper movable blade 40 of the shear, as shown in FIGURE 1.

That longitudinal and laterally offset section of the box bottom wall 22 which is aligned with the discharge opening 32 constitutes a main bed or bottom wall portion 42 and is generally trough or V-shaped in vertical section, as shown in FIGURES 2 and 4. Both the bottom edge of the discharge opening 32 and the bed 34 of the shear 36 are of the same configuration, so that the shear bed terminates, at its forward edge, in a fixed lower blade 44 having a V-shaped cutting edge 46 (FIGURES 1 and 2). The shear 36 is provided, rearwardly of the fixed lower blade 44, with the usual vertically-movable hold-down clamp 48 that may be operated by a hydraulic ram (not shown) and the underside of which is generally complementary to the V-shaped shear bed or feed table 34. The vertically-movable shear blade 40 which cooperates with the fixed lower blade 44 has a straight horizontal cutting edge 52 (FIGURE 1) and is operable by hydraulic rams (not shown).

In actual practice, it has been found that when plate-type scrap is moved, as later explained, through the discharge opening 32 across the shear bed 34, the hold-down clamp 48 tends to bend such flat scrap into the V-shaped configuration of the bed 34. When the thus bent scrap is sheared between the blades 40 and 44, however, the plate-like scrap tends to be straightened and flattened in the course of the shearing action, thus producing cut plate scrap that is substantially flat and, consequently, of higher density.

Figure 3:
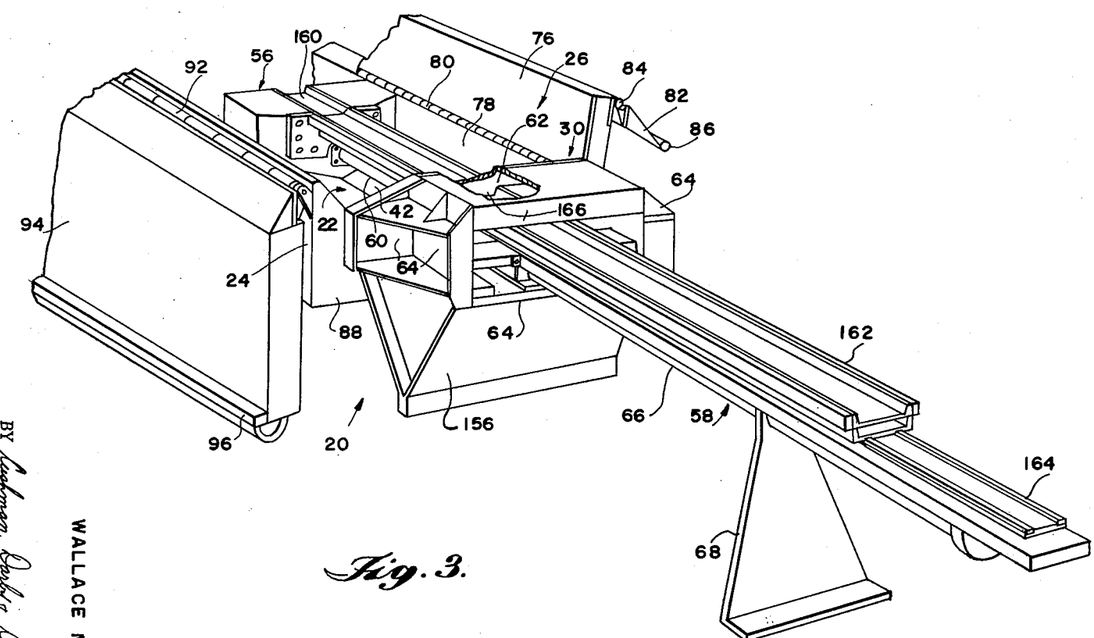
FIGURE 3 is a fragmentary perspective view of the rearward end of the charging box shown in FIGURE 2. The box is shown in its fully open condition, but with the charging ram somewhat advanced for purely illustrative purposes.

The end wall 30 of the charging box 20 opposite the shear 36 is provided with a generally rectangular wall portion 56 that is in alignment with and corresponds generally in size to the discharge opening 32 in the opposite end wall 28. This end wall portion 56 essentially constitutes the head of a hydraulic charging or pushing ram 58, so that the wall portion 56 can be moved inwardly of the box 20 by the ram piston rod 60 in order to move scrap from within the box through the discharge opening 32 and into the shear 36 to be cut into smaller pieces by the latter. The fixed portions of the end wall 30 are formed by an inner plate 62 which is reinforced and stiffened by appropriate vertical and horizontal backing plates 64 certain of which support the inner end of the cylinder 66 of the ram 58, as shown in FIGURE 3. The cylinder 66 also may be supported outwardly of the box 20 by a pedestal-like bracket 68.

Figure 5:
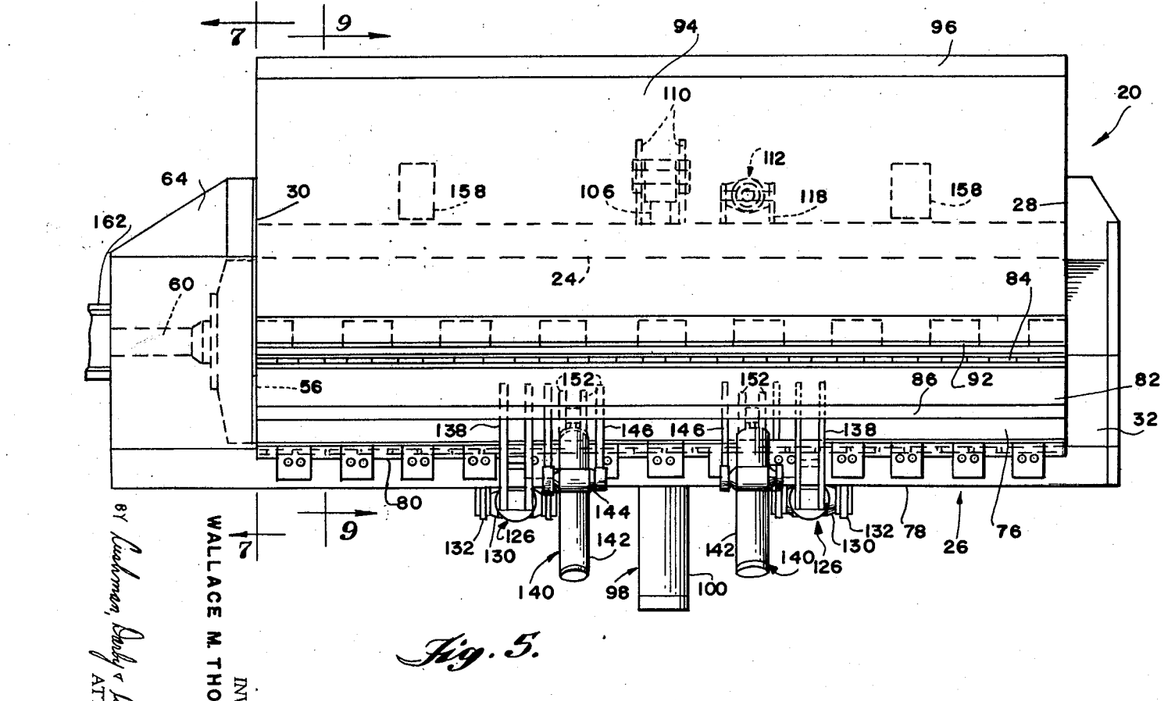
FIGURE 5 is a plan view of the charging box shown in FIGURES 2 to 4. The box is shown in its completely closed condition, and with the shear being omitted.
Figures 6, 7, 8:
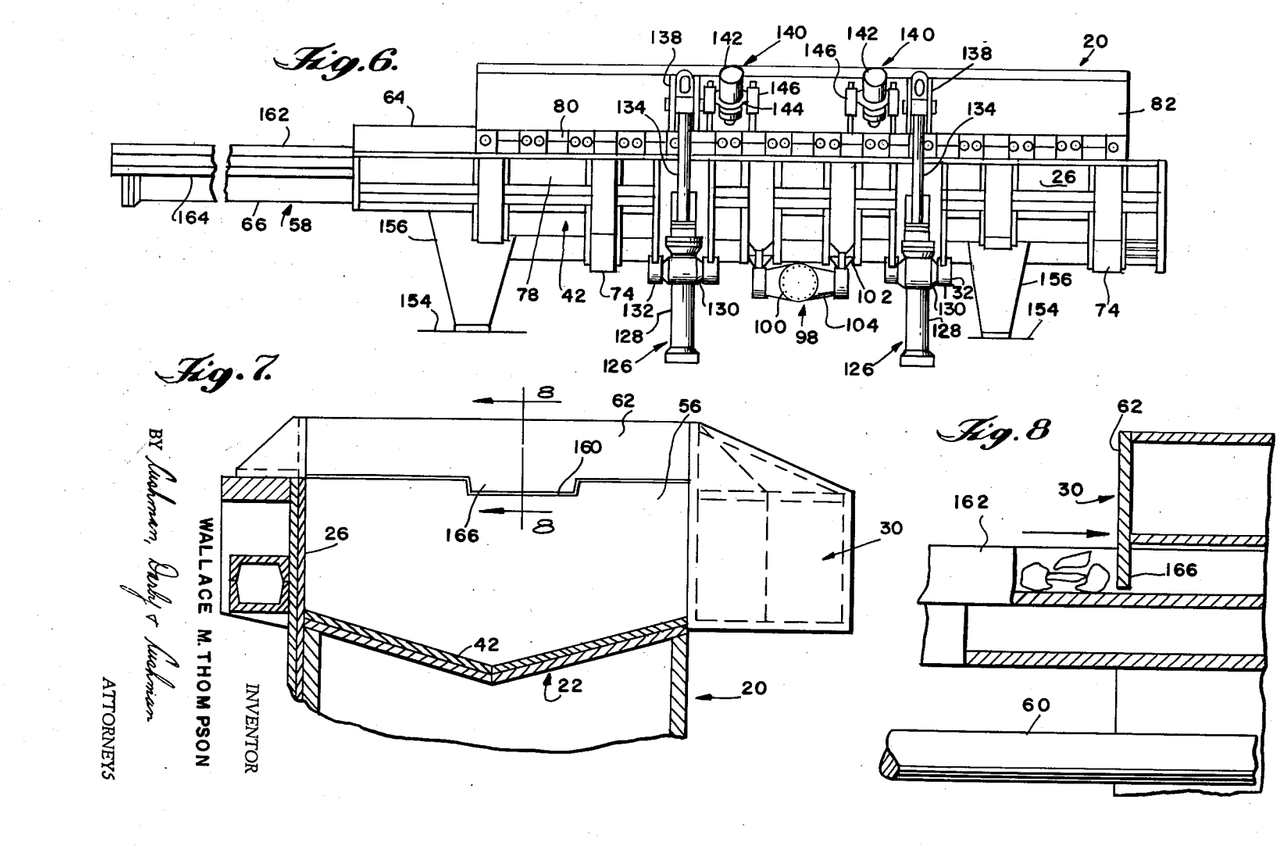
FIGURE 6 is a side elevational view of the charging box shown in FIGURE 5.
FIGURE 7 is a fragmentary sectional view taken substantially on line 7—7 of FIGURE 5.
FIGURE 8 is an enlarged fragmentary sectional view taken substantially on line 8—8 of FIGURE 7, and with the charging ram being shown somewhat advanced for illustrative purposes.

The main bed or bottom wall portion 42 of the box 20 is of box-girder-like construction having inner plates 70 backed by longitudinally extending reinforcing channel members and I beams 72 backed, in turn, by outer plates 74 spaced along the length of the box. The side walls 24 and 26 are integral with the longitudinal edges of the bottom wall 22 and also are of box-girder construction. The side wall 26 is considerably higher than the wall 24 and is divided horizontally into upper and lower rectangular portions 76 and 78, respectively, that are connected together by a piano hinge 80 which has its leaves secured in any appropriate fashion, as by welding, to the adjacent edges of the connected side wall portions. The arrangement is such that the upper side wall portion 76 is swingable from an upright position in vertical alignment with the lower side wall portion 78, as shown in FIGURES 2, 3 and 4, to an inwardly extending substantially horizontal position to partially form a lid for the box 20, as shown in FIGURES 5, 6 and 9.

Figures 11, 13, 14:
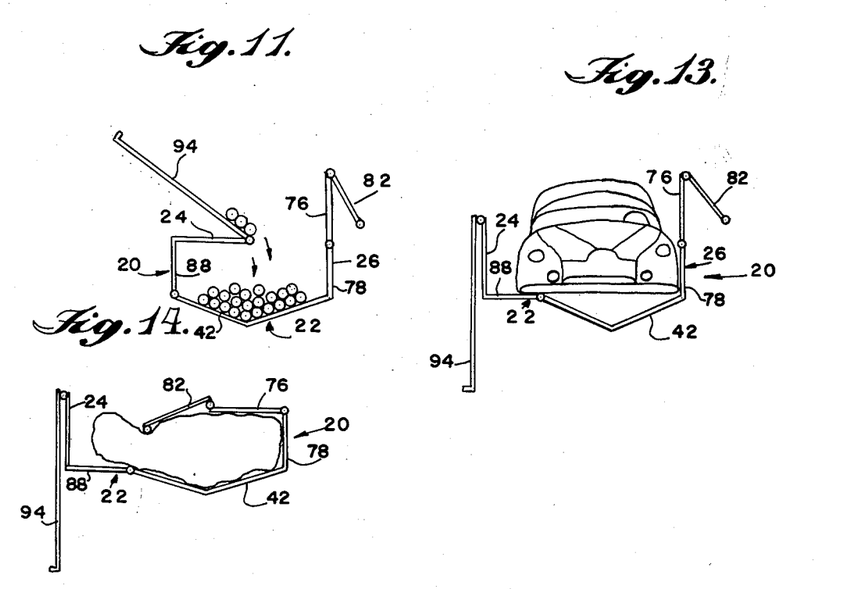

Pivotally secured to the upper outer edge of the upper side wall portion 76, and extending the full length thereof, is a tamper plate 82. This plate 82, which may be reinforced by appropriate backing plates so as to be substantially triangular in cross-section, is connected to the upper side wall portion 76 by a piano hinge 84 having its leaves welded, or otherwise suitably secured, to the plate 82 and to the side wall portion 76. The arrangement is such that the tamper plate 82 is movable from a position extending substantially inwardly at an acute angle to the plane of the upper side wall portion 76, as shown in FIGURE 14, into a position extending outwardly at an obtuse angle to such plane, as shown in FIGURES 4 and 9. Preferably, the outer edge of the tamper plate 82 is provided with a bead-like reinforcing member 86 extending the full length of the plate.

Figure 9:
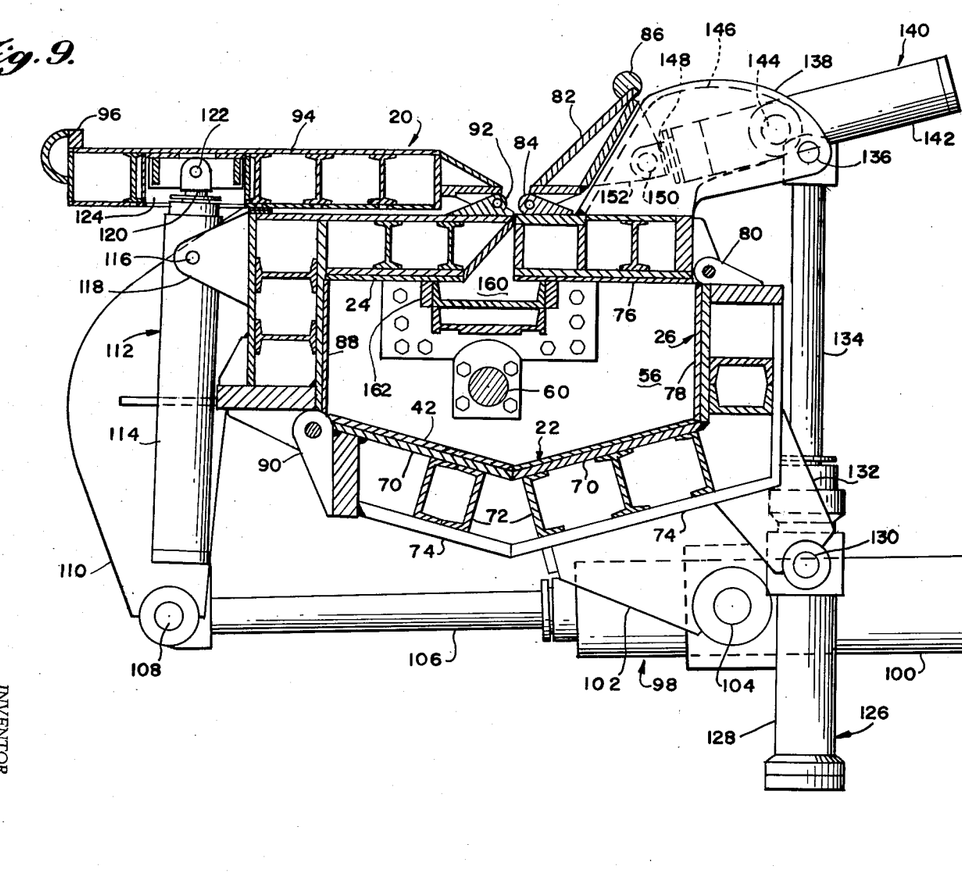
FIGURE 9 is an enlarged sectional view taken substantially on line 9—9 of FIGURE 5.

The remaining portion 88 of the bottom wall 22 of the box 20, i.e., the edge portion that is offset from or located to one side of the discharge opening 32, also is of box-girder construction having inner and outer plates connected by I beams, as shown in FIGURES 4 and 9. For reasons later evident, the width of this bottom wall edge portion 88 is equal to the height of the lower side wall portion 78. This bottom wall edge portion 88 is connected to the main bed or bottom wall portion 42 by a piano hinge 90 having its leaves secured in any appropriate manner, as by welding, to the outer sides of the connected portions. This hinge 90 is arranged to provide for pivotal movement of the bottom wall edge portion 88 from its horizontal position shown in FIGURE 4, to a substantially vertical or upright position, as shown in FIGURE 9. In this latter position, the side wall 24 forms the remainder of a lid for the box 20 and has its upper edge in close proximity and in opposition to the upper edge of the upper side wall portion 76 when the latter is in its inwardly extending position shown in FIGURE 9. In this closed position or contracted condition of the box 20, the ram head 56 substantially fills the cross-sectional area of the box, so that in advancing therethrough, the head will push all the metal scrap therein out through the discharge opening 32.

Figures 10, 12:
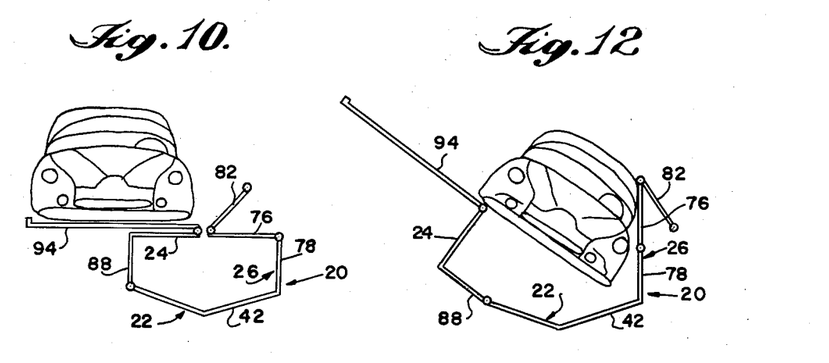
FIGURES 10 to 15 are diagrammatic views illustrating sequences of operation of the charging box shown in the preceding figures.

Pivotally connected to the outer and upper edge of the side wall 24, by a piano hinge 92, and extending the full length thereof, is a hopper plate 94 that is of greater width than, and normally is disposed in substantially parallel overlying relation to, the side wall 24. The plate 94, preferably, is of box girder construction having inner and outer plates connected together by I beams. The edge of the plate 94 remote from the hinge 92, preferably is provided with a rib-like projection 96 which forms a ledge for a purpose later evident. The hinge 92 is arranged so that the hopper plate 94 can be pivoted from its position substantially parallel to the side wall 24 into a position approaching approximately 90° relative to such wall, as shown in FIGURE 12.

Pivotal movement of the bottom wall edge portion 88 of the box 20, together with the entire corresponding side wall 24 which is integral therewith, is effected by a generally horizontally-extending hydraulic ram 98 disposed transversely beneath the box 20 and having its cylinder 100 pivotally connected to and between a pair of upright supporting plates 102 by horizontal trunnions 104. The end of the piston rod 106 of the ram 98 is pivotally connected, as by a transverse pivot pin 108, to and between a pair of plates 110 that are secured transversely to the underside of the bottom wall edge portion 88 and project inwardly thereof. Pivotal movement of the hopper plate 94 is effected by an independently controllable hydraulic ram 112 that has its cylinder 114 pivotally connected by trunnions 116 to and between a pair of lugs 118 which are welded or otherwise suitably secured to the underside of the bottom wall edge portion 88, as shown best in FIGURE 9. The free end of the piston rod 120 of the ram 112 is pivotally connected, by a pivot pin 122, to and between the side walls of a recess 124 in the rear or undersurface of the plate 94.

Pivotal movement of the upper side wall portion 76 is effected by a pair of generally upright hydraulic rams 126, controllable independently of the rams 98 and 112 and each having its cylinder 128 pivotally connected by trunnions 130 to and between a pair of supporting plates 132 welded or otherwise suitably secured to fixed portions of the box 20 adjacent a lower longitudinal edge thereof. The end of the piston rod 134 of each ram 126 is pivotally connected, as by a transverse pin 136, to and between a pair of reinforcing and stiffening plates 138 that are secured transversely to the outer side of the upper wall portion 76. Pivotal movement of the tamper plate 82 is effected by a pair of generally horizontally-disposed hydraulic rams 140 controllable independently of the other rams 98, 112 and 126 and each having its cylinder 142 pivotally connected by trunnions 144 to and between a pair of supporting plates 146 welded or otherwise suitably secured to the outer side of the upper side wall portion 76. The free end of the piston rod 148 of each ram 140 is pivotally connected, as by a transverse pivot pin 150, to and between a pair of lugs 152 welded or otherwise appropriately secured to the outer side of the tamper plate 82.

The charging box 20 may be supported on any appropriate foundation 154 by two or more longitudinally-spaced pedestal-like supports 156 secured to and beneath the main bed 42 of the box, as shown in FIGURE 6. Two or more pedestal-like supports 158 may be secured to the foundation 154 to one side of the main bed 42 in position to support the bottom wall edge portion 88 of the box 20 when the latter is fully open, as shown in FIGURE 4.

As shown best in FIGURES 3 and 7, the end wall portion or ram head 56 has a relatively wide notch 160 in its upper edge located beneath the gap or dividing line between the wall portions or lid parts 24 and 76 when the box 20 is closed. Secured to and extending rearwardly from the rear or outer face of the ram head 56 is an upwardly-facing channel member 162 so arranged that its channel surfaces are flush with the edges of the notch 160. The channel member 162 is as long as the full stroke of the charging ram 58 and its rearwardly extending portion rests and is guided on a guide member 164 mounted and secured on top of the ram cylinder 66, as shown best in FIGURE 3. It will be seen that as the head of the ram 58, i.e., the end wall portion 56, is moved into the charging box 20 by the piston rod 60 of the ram, the channel member 162 will move inwardly therewith immediately beneath the gap or dividing line between the lid parts 24 and 76 when the box is closed. Consequently, any dirt or debris which sifts downwardly behind the ram head 56 through the slit in the lid will lodge in the channel member 162.

The ram head 56 fits in a complementary opening in the end wall 30 so that the latter has a tongue 166 depending into close proximity to the surface of, and which is complementary to, the notch 160 and the channel member 162. Hence, as the ram head 56 retracts after a pushing stroke, any dirt or other debris that has sifted down through the parting line between the two lid parts into the channel 162 will be pushed therefrom by the tongue 166 back into the charging box 22 in front of the ram head 56, as shown in FIGURE 8.

Referring next to FIGURES 10 to 15 of the drawings, there is shown a normal sequence of operations for compressing and confining bulky scrap in the charging box 20. Thus, referring first to FIGURE 10, the charging box 20 is shown in the fully closed position assumed while the ram head 56 is being advanced to move metal scrap from the box through the shear 36. While these step-by-step advancing and intermittent shearing operations are progressing, scrap can be loaded on top of the hopper plate 94, by a crane (not shown) or the like. The ledge 96 on the plate 94 serves to retain scrap thereon while the angular position of the tamper plate 82 is in the closed position of the box prevents scrap loaded on the plate 94 from spilling over onto the upper side wall portion 76, then serving as part of the box lid.

If the scrap loaded onto the plate 94 is scrap pipe or elongated structural material, the first operation simply will be to operate the rams 126 to pivot the upper side wall portion 76 into its substantially vertical position, thus partially opening the charging box 20. The ram 112 can then be operated to tilt the hopper plate 94 up into the position shown in dotted lines in FIGURE 11, so that the scrap pipe or the like will simply fall down into the charging box 20. The V-bottom of the main bed 42 of the box will tend to align such material longitudinally of the box.

In the event, however, that the scrap loaded on the plate 94 is bulky, such as an automobile body and frame, as shown in FIGURE 10, in addition to moving the upper side wall portion 76 into its upright position, as described before with reference to FIGURE 11, the box lid is completely opened by also pivoting the bottom wall edge portion 88, as shown in FIGURE 12, from its upright into its generally horizontal position, thereby moving the side wall 24 from its lid-forming position into its box-open position, as shown in FIGURE 13. At the same time that the bottom wall edge portion 88 and side wall 24 are being swung from their box-closed into their box-open position, the hopper plate 94 is tilted upwardly, by operation of its ram 112, to allow the bulky scrap thereon to fall into the charging box 20, as shown in FIGURE 12. Because the box 20 is fully open at the end of such operations, the bulky scrap can be received therein.

The next step in the operations will be to close the box 20 by pivoting the upper side wall portion 76 from its upright to its horizontal lid-forming position, and to pivot the bottom wall edge portion 88 and side wall 24 from their box-open to their box-closed positions wherein the side wall 24 forms the remainder of the box lid. In some instances, it may be desirable, as shown in FIGURE 14, to move the upper side wall portion 76 into its lid-forming position prior to pivoting the bottom wall edge portion 88 into its upright position. Obviously, pivoting the upper side wall portion 76 into its horizontal position will tend to crush and compress the bulky scrap into a smaller bundle. Portions of the bulky scrap, however, still might project above that portion of the box lid formed by the upper side wall portion 76. In that event, the tamper plate 82 can be operated, as shown in FIGURE 14, to tamp and compress any such projecting portions of the bulky scrap down into the box 20, so that the side wall 24 can be moved into its lid-forming position without interference by protrusion of scrap between the two lid parts.

Figure 15:
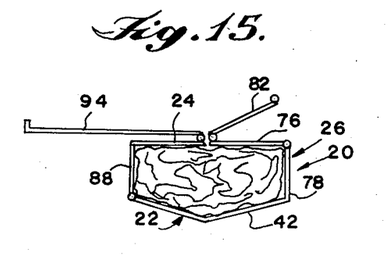

In the final closed position of the charging box shown in FIGURE 15, it will be seen that all of the bulky scrap has been compressed and confined into the smaller contracted or closed position of the box 20. In this closed position of the box 20, the charging ram 58 can be operated to move the end wall portion 56 inwardly of the box and thus move the smaller bundle of compressed scrap out of the discharge opening 32 and into the shear 36. At the same time that this operation is taking place, additional scrap can be loaded onto the hopper plate 94.

As aforedescribed, if the scrap thus loaded into the box 20 is elongated structural members or pipe, the V bottom of the box will tend to align such scrap longitudinally thereof, an obviously desirable result from the standpoint of the operation of the shear 36. The scrap whatever its nature, is pushed out of the charging box 20 by the ram 58 in a step-by-step movement, i.e., the scrap is pushed beyond the fixed cutting edge 46 of the shear 36 a desirable distance, the ram 58 is halted, and the hold-down clamp 48 is then moved down to hold the scrap against the shear bed 34 while the upper movable shear blade 40 descends to cut off the scrap projecting beyond the fixed blade 44. In the event that the scrap thus being sheared is in plate form, it will be seen that it will be bent by the clamp 48 generally into the configuration of the V-shaped bed 34 of the shear. Consequently, as the upper movable shear blade 40 descends, it will first engage and shear those portions of the scrap adjacent the opposite ends of the fixed and movable shear blades 44 and 40, and thus tend to bend the ends of the scrap piece being cut off downwardly simultaneously with the shearing action. The net result will be that the plate scrap which has been bent into a generally V-shaped configuration by the hold-down clamp 48, will be rebent into a substantially flat configuration by the shearing operation.

It thus will be seen that the objects of this invention have been fully and effectively accomplished. It will be realized, however, that the foregoing specific embodiment has been shown and described only for the purpose of illustrating the principles of this invention and is subject to extensive change without departure from such principles. Therefore, this invention includes all modifications encompassed within the spirit and scope of the following claims.

I claim:

1. A charging box for a machine for operating on metal scrap comprising: a box-like receptacle having an open top, a bottom wall, a pair of opposed end walls, and two opposed upright side walls, said bottom wall including a main portion and an edge portion hinged thereto about an axis parallel to said side walls for pivotal movement between substantially horizontal and substantially upright positions, one of said side walls being fixedly secured to said bottom wall edge portion, and one of said end walls having an inwardly movable portion the lower edge of which conforms to and is substantially coextensive with the width of said bottom wall main portion and the height of which is substantially equal to the width of said bottom wall edge portion; and a hopper plate coextensive in length with said one side wall and hinged to the upper edge thereof about an axis parallel to said first-mentioned axis for pivotal movement between a position extending outwardly at an angle approaching 90° to the plane of said one side wall and a position extending downwardly on the outer side of and substantially parallel to said one side wall, whereby when said hopper plate is in said parallel position and said edge portion is in said upright position, said plate is horizontal and scrap can be deposited thereon and subsequently dumped into said receptacle by pivotal movement of said edge portion toward its said horizontal position and pivotal movement of said plate toward its said angular position.

2. The structure defined in claim 1 including reciprocating fluid motor means connected to the bottom wall portions for pivoting the edge portion and additional reciprocating fluid motor means connected to the one side wall and to the hopper plate for pivoting the latter.

3. The structure defined in claim 1 in which the other end wall has an opening therein, substantially coextensive and aligned with said one end wall movable portion, and including means for moving said one end wall movable portion toward and away from said other end wall.

4. The structure defined in claim 1 in which the other side wall includes upper, intermediate and lower portions, said lower portion being fixedly secured to the bottom wall main portion, said intermediate portion being hinged to said lower portion about an axis parallel to said first-mentioned axis for pivotal movement between a position substantially coplanar with said lower portion and a position extending inwardly and at an angle of 90° thereto, and said upper portion being hinged to said intermediate portion about an axis parallel to said first-mentioned axis for pivotal movement from a position inclined inwardly from the plane of said intermediate portion to a position inclined outwardly at an obtuse angle thereto.

5. The structure defined in claim 4 in which the width of the bottom wall edge portion is substantially equal to the height of the other side wall lower portion and the combined heights of the one side wall and the other side wall intermediate portion are substantially equal to the width of the bottom wall main portion.

6. An expansible and contractible charging box for a machine for operating on scrap metal, comprising: a box-like receptacle having a bottom wall and two opposed upright side walls, one of said side walls being hinged to said bottom wall about an axis parallel to said side walls for pivotal movement between substantially upright and substantially horizontal outwardly extending positions; top closure means for said receptacle including a wall portion substantially coextensive with and fixedly secured to the upper edge of said one side wall and extending inwardly thereof; means connected to said receptacle for moving scrap therein toward one end thereof; and a hopper plate substantially coextensive with and hinged to the inner edge of said wall portion about an axis substantially parallel to said first-mentioned axis for pivotal movement between a position overlying and substantially parallel to said wall portion and a position inclined at an angle thereto, whereby when said plate is in said parallel position and said one side wall is in said upright position, said plate is horizontal and scrap can be deposited thereon and subsequently dumped into said receptacle by pivotal movement of said one side wall toward its said horizontal position and pivotal movement of said plate towards its said inclined position.

7. The structure defined in claim 6 in which the side walls are of substantially equal height and the closure means further includes an additional wall portion substantially coextensive with and hinged to the upper edge of the other side wall for pivotal movement between substantially upright and substantially horizontal inwardly extending positions, the combined widths of said wall portions being substantially equal to the width of the bottom wall.

8. The structure defined in claim 7 including a combined hopper and tamper plate substantially coextensive with and hinged to that edge of the additional wall portion opposite the other side wall for pivotal movement between a position inclined inwardly from the plane of said additional wall portion and a position inclined outwardly at substantially an obtuse angle thereto.

9. A charging box for a machine for operating on metal scrap comprising: a box-like receptacle having a bottom wall, a pair of end walls a pair of opposed upright side walls, and lid means, one of said side walls being hinged to said bottom wall about an axis parallel to said side walls for pivotal movement between upright and substantially horizontal outwardly extending positions; an inwardly-extending first wall portion substantially coextensive with and fixed to the upper edge of said one side wall and constituting a portion of said lid means; a hopper plate substantially coextensive with and hinged to the inner edge of said wall portion about an axis parallel to said first-mentioned axis for pivotal movement between a position extending outwardly and substantially parallel to said wall portion, and a position inclined at an angle to said wall portion; and a second wall portion substantially coextensive with and hinged to the upper edge of the other side wall for pivotal movement between substantially upright and substantially horizontal, inwardly extending positions, said second wall portion constituting the remaining portion of said lid means, whereby when said one side wall is in its said upright position and said inner plate is in its said parallel position, said plate is horizontal and scrap can be deposited thereon and subsequently dumped into said receptacle by pivotal movement of said one side wall towards its said horizontal position and pivotal movement of said plate towards its said inclined position, one of said end walls having an inwardly movable portion substantially coextensive with the area circumscribed by said bottom wall, side walls, and lid means when both said portions of said lid means are substantially horizontal.

10. The structure defined in claim 9 including first reciprocating fluid motor means connected to the bottom wall and to the one side wall for pivoting the latter, second reciprocating fluid motor means connected to the first wall portion and to the hopper plate for pivoting the latter, and third reciprocating fluid motor means connected to the other side wall and to the second wall portion for pivoting the latter.

11. The structure defined in claim 9 in which the combined widths of the first and second wall portions is substantially equal to the width of the bottom wall.

12. The structure defined in claim 9 in which the other end wall is provided with an opening aligned with said movable portion.

13. The structure defined in claim 9 including a combined hopper and tamper plate substantially coextensive with and hinged to the inner edge of the second wall portion for pivotal movement between a position inclined inwardly of said second wall portion to a position inclined outwardly at an obtuse angle to said second wall portion.

14. The structure defined in claim 13 including reciprocating fluid motor means connected to the second wall portion and to the tamper plate hinged thereto for pivoting the latter.

15. An expansible and contractible charging box for a machine for operating on scrap metal, comprising: a box-like receptacle having a bottom wall, a pair of opposed side walls, an end wall, and a lid divided along a line parallel to said side walls, one of said side walls being hinged to said bottom wall about an axis parallel to said side walls for pivotal movement between substantially upright and substantially horizontal outwardly extending positions, one portion of said lid being fixed to said one side wall and the other portion of said lid being hinged to the other side wall about an axis parallel to said first-mentioned axis for pivotal movement between substantially upright and substantially horizontal positions, said end wall having a portion movable inwardly and substantially coextensive with the area circumscribed by said bottom wall, side walls, and lid when both said portions of said lid are substantially horizontal; and a tamper plate hinged to the inner edge of said lid other portion about an axis parallel to said other axes for movement between a position inclined inwardly of said other lid portion and a position inclined outwardly thereof.

16. A charging box for a machine for operating on scrap metal comprising: a box-like receptacle having a pair of opposed upright side walls, a bottom wall, and an end wall movable inwardly between said side walls and over said bottom wall; lid means for said receptacle having at least two parts presenting, when closed, a parting line therebetween extending normally of said end wall between said side walls; means mounting said parts for inward pivotal movement from open to closed positions about axes parallel to said side walls to compress scrap metal into said receptacle; a power cylinder mounted to said receptacle exteriorly thereof parallel to the direction of movement of said end wall; a piston in said cylinder having a rod connected to said end wall for effecting movement thereof; and elongated plate-like means fixed to said end wall and extending exteriorly thereof parallel to said parting line, the edges of said plate-like means being spaced from said side walls and said plate-like means being movable inwardly with said end wall immediately beneath said parting line and above said piston rod in order, and being of a width only sufficient, to catch dirt or debris falling into said receptacle between said lid means parts when the latter are closed.

17. A charging box for a machine for operating on scrap metal comprising: a box-like receptacle having a pair of opposed upright side walls, a bottom wall, and an end wall movable inwardly between said side walls and over said bottom wall; lid means for said receptacle having at least two parts presenting, when closed, a parting line therebetween extending normally of said end wall between said side walls; means mounting said parts for inward pivotal movement from open to closed positions about axes parallel to said side walls to compress scrap metal into said receptacle; and elongated plate-like means fixed to and extending exteriorly of said end wall immediately below said parting line, the side edges of said plate-like means being spaced from said side walls and said plate-like means being movable inwardly with said end wall immediately beneath said parting line in order, and being of a width only sufficient, to catch dirt or debris falling into said receptacle behind said end wall between said lid means parts when the latter are closed.

18. The structure defined in claim 17 in which the end wall has a notched portion in its upper edge, the plate-like means is channel-shaped in cross-section and defines an extension of said notched portion, and including a wall portion fixed to said receptacle and complementary to and depending into said notched portion in the outermost position of said end wall to sweep into said receptacle, on retraction of said end wall, any dirt or debris which may have fallen between said lid means parts onto said plate-like means while said end wall is in an inward position.

19. An expansible and contractible charging box for a machine for operating on metal scrap, comprising: a box-like receptacle having an open top, a bottom wall, a pair of opposed end walls, and a pair of opposed side walls, said bottom wall including a main position and an edge portion hinged thereto about an axis parallel to said side walls for swinging movement between a substantially horizontal position wherein the receptacle is expanded and a substantially upright position wherein the receptacle is contracted, one of said side walls being fixedly secured to said bottom wall edge portion for swinging movement therewith to form at least a portion of a lid for said receptacle when said bottom wall edge portion is in said upright position to contract said receptacle, the other of said side walls being fixedly secured to said bottom wall main portion, one of said end walls having a discharge opening therein substantially coextensive with the interior cross section of said receptacle when contracted, and the other of said end walls having a portion movable inwardly of said receptacle and aligned with and substantially coextensive with said discharge opening for pushing scrap therethrough from within said receptacle.

20. The structure defined in claim 19 in which the other side wall includes a lower portion and an upper portion hinged thereto for swinging movement from a substantially upright position to an inner substantially-horizontal position to form the remainder of the lid for the receptacle.

21. An expansible and contractible charging box for a machine for operating on scrap metal comprising: a box-like receptacle having a bottom wall, a pair of opposed side walls, an end wall, and a lid divided into two portions along a line parallel to said side walls, one of said lid portions being pivotally movable about an axis parallel to said side walls from a substantially horizontal position upwardly and outwardly to a substantially upright position, said end wall having a portion movable inwardly between said side walls and between said bottom wall and said lid; and a hopper plate coextensive in length with said one lid portion and hinged to the inner edge thereof about an axis parallel to said first-mentioned axis for pivotal movement between a position overlying and substantially parallel to said one lid portion and a position inclined at an angle thereto, whereby when said one lid portion is in its said horizontal position and said hopper plate is in its said overlying position, said plate is horizontal and scrap can be deposited thereon and subsequently dumped into said box by pivotal movement of said one lid portion toward its said upright position and pivotal movement of said plate towards its said inclined position.

22. The structure defined in claim 21, including elongated plate-like means fixed to and extending exteriorly of said end wall immediately below the dividing line between the two lid portions, said plate-like means being movable inwardly with said end wall immediately beneath said line to catch dirt or debris falling between said lid portions into said receptacle behind said end wall.

23. The structure defined in claim 16 in which at least one of the lid parts is fixedly secured to the adjacent side wall and in which the mounting means for said part includes means pivotally mounting said adjacent side wall to the adjacent edge of the bottom wall for movement between substantially horizontal and substantially upright positions.

24. The structure defined in claim 17 in which at least one of the lid parts is fixedly secured to the adjacent side wall and in which the mounting means for said part includes means pivotally mounting said adjacent side wall to the adjacent edge of the bottom wall for movement between substantially horizontal and substantially upright positions.

References Cited in the file of this patent

UNITED STATES PATENTS

| | | |
|---|---|---|
| 594,019 | Jefferies | Nov. 23, 1897 |
| 610,584 | Guild et al. | Sept. 13, 1898 |
| 1,597,921 | Okins | Aug. 31, 1926 |
| 2,244,078 | Perlberg | June 3, 1941 |
| 2,616,312 | Jones et al. | Nov. 4, 1952 |
| 2,690,115 | Sinclair | Sept. 28, 1954 |
| 2,932,247 | Thompson | Apr. 12, 1960 |

FOREIGN PATENTS

| | | |
|---|---|---|
| 201,976 | Austria | Feb. 10, 1959 |
| 830,553 | Great Britain | Mar. 16, 1960 |